US011891282B2

(12) United States Patent
Groves

(10) Patent No.: US 11,891,282 B2
(45) Date of Patent: Feb. 6, 2024

(54) HOISTING AND LOWERING DEVICE

(71) Applicant: Grid Manufacturing Corporation, Meridian, ID (US)

(72) Inventor: Mark Groves, Meridian, ID (US)

(73) Assignee: GRID MANUFACTURING CORPORATION, Meridian, ID (US)

( * ) Notice: Subject to any disclaimer, the term of this patent is extended or adjusted under 35 U.S.C. 154(b) by 0 days.

(21) Appl. No.: 18/181,154

(22) Filed: Mar. 9, 2023

(65) Prior Publication Data

US 2023/0278836 A1 Sep. 7, 2023

Related U.S. Application Data

(60) Continuation of application No. 16/915,487, filed on Jun. 29, 2020, now Pat. No. 11,603,296, which is a continuation of application No. 15/960,273, filed on Apr. 23, 2018, now Pat. No. 10,737,919, which is a division of application No. 15/623,730, filed on Jun. 15, 2017, now Pat. No. 9,975,744, which is a continuation of application No. 13/553,641, filed on Jul. 19, 2012, now abandoned.

(60) Provisional application No. 61/572,608, filed on Jul. 19, 2011.

(51) Int. Cl.

| | |
|---|---|
| ***B66D 3/00*** | (2006.01) |
| ***B66D 3/04*** | (2006.01) |
| ***A62B 1/10*** | (2006.01) |

(52) U.S. Cl.
CPC ................ *B66D 3/046* (2013.01); *A62B 1/10* (2013.01); *B66D 3/04* (2013.01)

(58) Field of Classification Search
CPC .. B66D 3/046; B66D 3/04; A62B 1/08; A62B 1/06; A62B 1/10
See application file for complete search history.

(56) References Cited

U.S. PATENT DOCUMENTS

| | | | |
|---|---|---|---|
| 524,403 | A | 8/1894 | Rowland |
| 596,198 | A | 12/1897 | Williams |
| 666,028 | A | 1/1901 | Schaefer |
| 794,728 | A | 7/1905 | Minetti |
| 796,366 | A | 8/1905 | Smith |
| 907,004 | A | 12/1908 | Carlson |
| 968,811 | A | 8/1910 | Stam |
| 973,177 | A | 10/1910 | Davis et al. |
| 1,406,560 | A | 2/1922 | Houghton |
| 1,428,118 | A | 9/1922 | Robeson |
| 1,531,746 | A | 3/1925 | Fort |

(Continued)

FOREIGN PATENT DOCUMENTS

| | | |
|---|---|---|
| DE | 202010008533 U1 | 12/2010 |
| WO | WO 2006/0091369 | 5/2006 |

*Primary Examiner* — Emmanuel M Marcelo
(74) *Attorney, Agent, or Firm* — Knobbe Martens Olson & Bear LLP

(57) ABSTRACT

A device, system and method are used for hoisting and lowering a load. The device has a front plate that may be displaced to reveal a sheave. The device also has a friction accessory. The friction accessory is arranged to create friction between a rope and the device when a load is suspended from the device using the rope and where the device is secured to a support structure. The system may be prepared by an operator, having ascended to an elevated location, and further allows the operator to lower the load from the elevated location prior to descending.

20 Claims, 9 Drawing Sheets

(56) References Cited

U.S. PATENT DOCUMENTS

| | | | | |
|---|---|---|---|---|
| 1,650,904 | A | 11/1927 | Mckissick | |
| 1,733,640 | A | 10/1929 | Wright | |
| 1,828,897 | A | 10/1931 | Hollingsworth | |
| 2,082,169 | A | 6/1937 | Mckissick | |
| 2,164,894 | A | 7/1939 | Bentley | |
| 2,449,703 | A | 9/1948 | Johnson | |
| 2,555,059 | A | 5/1951 | Schrader | |
| 2,762,607 | A | 9/1956 | Duncan | |
| 3,717,219 | A | 2/1973 | Hoffman | |
| 3,759,346 | A | 9/1973 | Brda | |
| 3,797,806 | A | 3/1974 | Demmert | |
| 3,946,989 | A | 3/1976 | Tsuda | |
| 4,220,315 | A | 9/1980 | Gris | |
| 4,264,056 | A | 4/1981 | Singer | |
| 4,770,394 | A | 9/1988 | Yang | |
| 5,056,760 | A | 10/1991 | Jorgensen | |
| 5,249,543 | A | 10/1993 | Rutgerson | |
| 2,343,086 | A | 2/1994 | Schultz | |
| 5,435,766 | A | 7/1995 | Epstein | |
| 5,911,410 | A | 6/1999 | Wullimann | |
| 6,223,868 | B1 | 5/2001 | Wullimann | |
| 6,386,516 | B1 | 5/2002 | Lenders | |
| 7,168,687 | B2 | 1/2007 | Thompson | |
| 8,474,112 | B2 | 7/2013 | Thompson | |
| 9,604,079 | B2 | 3/2017 | Merritt | |
| 10,054,176 | B2 | 8/2018 | Heath | |
| 2006/0207829 | A1 | 9/2006 | Mauthner | |
| 2008/0203371 | A1 | 8/2008 | Mauthner | |
| 2012/0241700 | A1 * | 9/2012 | Mauthner ................ | A62B 1/14 254/391 |

* cited by examiner

HOISTING AND LOWERING DEVICE

CROSS-REFERENCE TO RELATED APPLICATIONS

This application is a continuation of U.S. patent application Ser. No. 16/915,487, filed Jun. 29, 2020, which is a continuation of U.S. patent application Ser. No. 15/960,273, filed Apr. 23, 2018, which is a divisional of U.S. patent application Ser. No. 15/623,730, filed Jun. 15, 2017, which is a continuation of U.S. patent application Ser. No. 13/553,641, filed Jul. 19, 2012, which claims priority from U.S. provisional application Ser. No. 61/572,608, filed Jul. 19, 2011.

FIELD

The present disclosure relates to device and method for hoisting or lowering a load. More specifically, the present disclosure relates to a life-saving rescue device that may be used to lower an injured person from an elevated location.

BACKGROUND

Pulleys are often used to hoist and/or lower loads in connection with a rope or cable, as generally known in the art. A pulley typically comprises a wheel or sheave that turns on an axis. When used in connection with a rope, a pulley can be used to change the direction of a tension force placed on the rope.

Pulleys are used in several configurations and for various purposes. One example is a block and tackle arrangement in which two pulleys work in unison, one pulley being fixed and another free to move with the load. This simple device may be used to create a mechanical advantage, wherein the tension force required to lift a load is decreased by a factor of two or more, in exchange for a decrease in the speed at which the load ascends. Some sophisticated examples of modern block and tackle arrangements use pulleys in combination with braking and/or clutch devices.

In general, block and tackle systems often require a significant amount of time to prepare for use. The time and effort spent in arranging the elements of a block and tackle system are problematic where the location of the load is remote or where the need to move a load becomes urgent. One example in which a block and tackle arrangement is often impractical is a rescue situation. For example, it is not practical to arrange a block and tackle system where a person has been injured while working in an elevated space, such as where a person has lost consciousness while working on a power line and remains suspended from the power pole.

As an example of the prior art, U.S. Pat. No. 4,220,315 discloses a pulley having an auxiliary braking system, enabling the operator (e.g., rescue personnel) to quickly assemble the device and lower the injured person in a short amount of time. The auxiliary braking system of the prior art comprises a spindle in a chamber, the path of the rope through the chamber comprises a loop of greater than 180°. The load bearing portion of the rope is suspended directly from the sheave, while the operator controls the rope entering the chamber of the auxiliary braking system. The spindle is arranged such that the axis of the spindle may move laterally within the chamber, enabling the operator to control the braking function, in part, by manipulating the angle of the rope entering the chamber.

Disadvantages of this and other existing solutions include that the braking system of currently available devices must frequently be operated from below the device. Further, the amount of complexity involved in arranging the rope in an auxiliary braking system remains high for an operator in view of the expected stress of a rescue effort.

SUMMARY

The present disclosure provides a device, system and method for hoisting and lowering a load that provides significant advantages over the prior art. For example, the aspects of the present disclosure may be used to significantly reduce the amount of preparation time required, while also providing the operator (i.e., user) with enough resistance to have a substantial control when lowering a heavy load, even where circumstances place the operator in a precarious position, such as where the operator is at an elevated position and is working within a limited space or surface area, thereby decreasing the amount of leverage available. The system of the present disclosure may be prepared by an operator at an elevated location and allows the operator to lower the load from the elevated location prior to descending. Thus, the system of the present disclosure provides significant advantages in time and simplicity in comparison with the prior art, without sacrificing the security of the load.

One aspect of the present disclosure provides a device for hoisting or lowering a load, comprising a friction accessory attached to a pulley, the pulley comprising a main body, a sheave, and a front plate. The front plate is configured to have a closed position and an open position, the open position exposing a chamber between the sheave and the main body. The friction accessory may be a hook-shaped appendage extending from the bottom of the pulley, and formed integral therewith.

In another aspect of the present disclosure, the device described herein is used as a component of a system, wherein a cord may be connected to the device and attached to a load, and the device may be attached to a support structure. The device is oriented such that the weight of the load creates friction between the cord and the device. In some embodiments the load may be a victim, such as an injured person.

Yet another aspect of the present disclosure provides a method for rescuing a victim using the device and system described herein. The device is secured to a support structure. The rope is placed in the device, for example, by moving the front plate to an open position, loading the rope into the chamber, and replacing the front plate to the closed position. The rope is then placed through the friction accessory and attached to the victim. Finally, the victim is hoisted or lowered as necessary to complete the rescue.

Other systems, methods, features, and advantages of the present disclosure will be or become apparent to one with skill in the art upon examination of the following drawings and detailed description. The features, functions and advantages that have been discussed can be achieved independently in various embodiments of the present invention or may be combined in yet other embodiments further details of which can be seen with reference to the following description and drawings.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

In the following description, reference is made to the accompanying drawings, which form a part hereof, and in which is shown, by way of illustration, various embodiments of the present disclosure. It is understood that other embodiments may be utilized and changes may be made without departing from the scope of the present invention.

Figure 1:
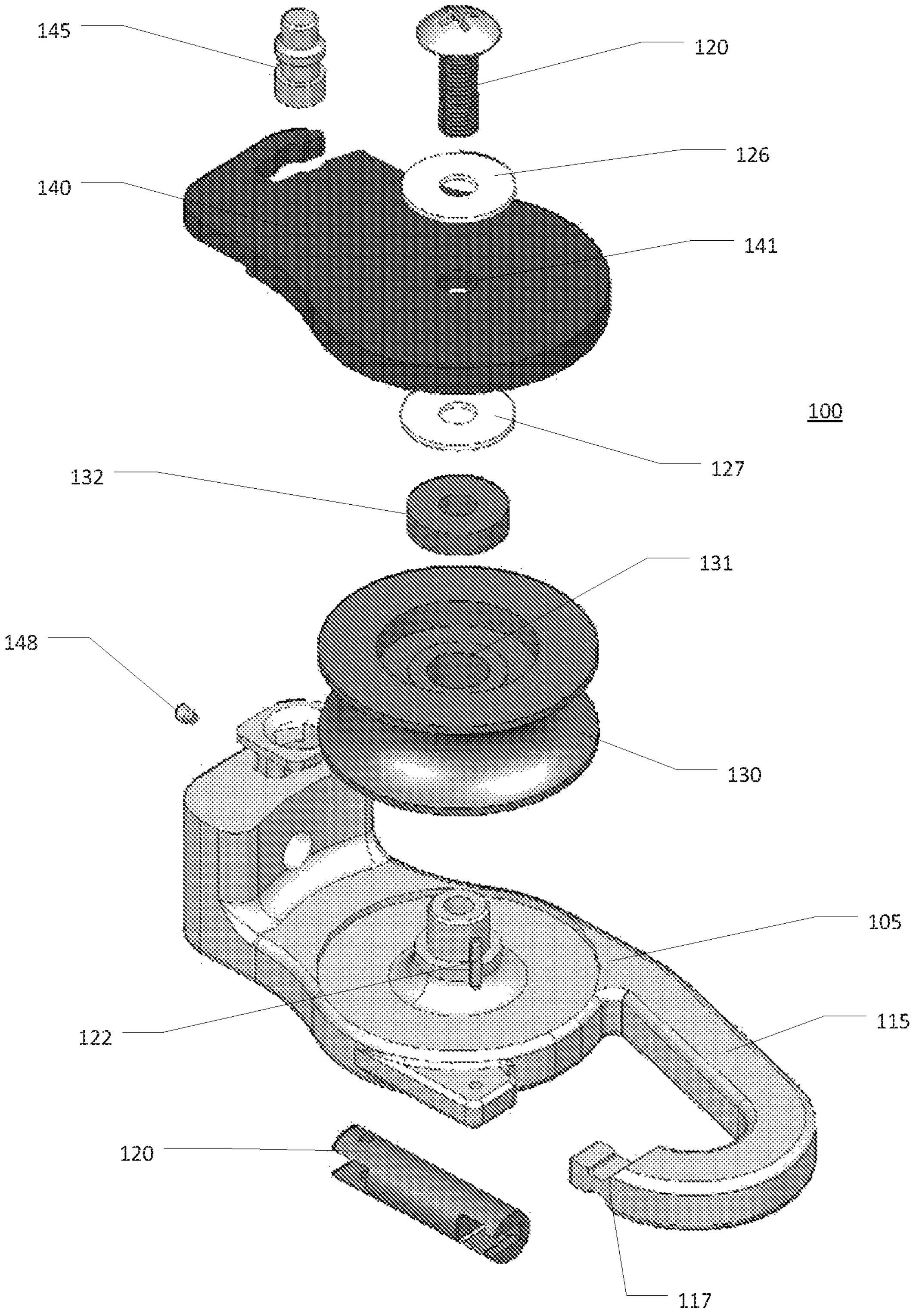
FIG. 1 is an exploded view of a device for hoisting and lowering a load according to one embodiment of the present disclosure.
Figure 2A:
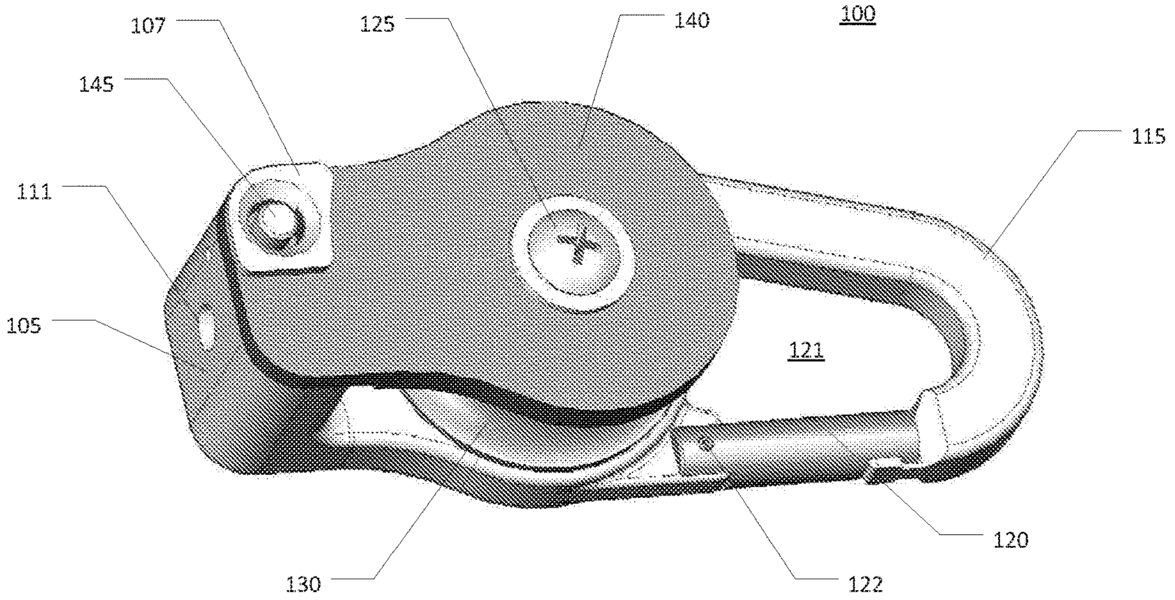
FIGS. 2A and 2B are drawings depicting a perspective view of the device for hoisting and lowering a load in accordance with the embodiment shown in FIG. 1, wherein the front plate and gate thereof are shown in closed and open positions in FIGS. 2A and 2B, respectively.
Figure 2B:
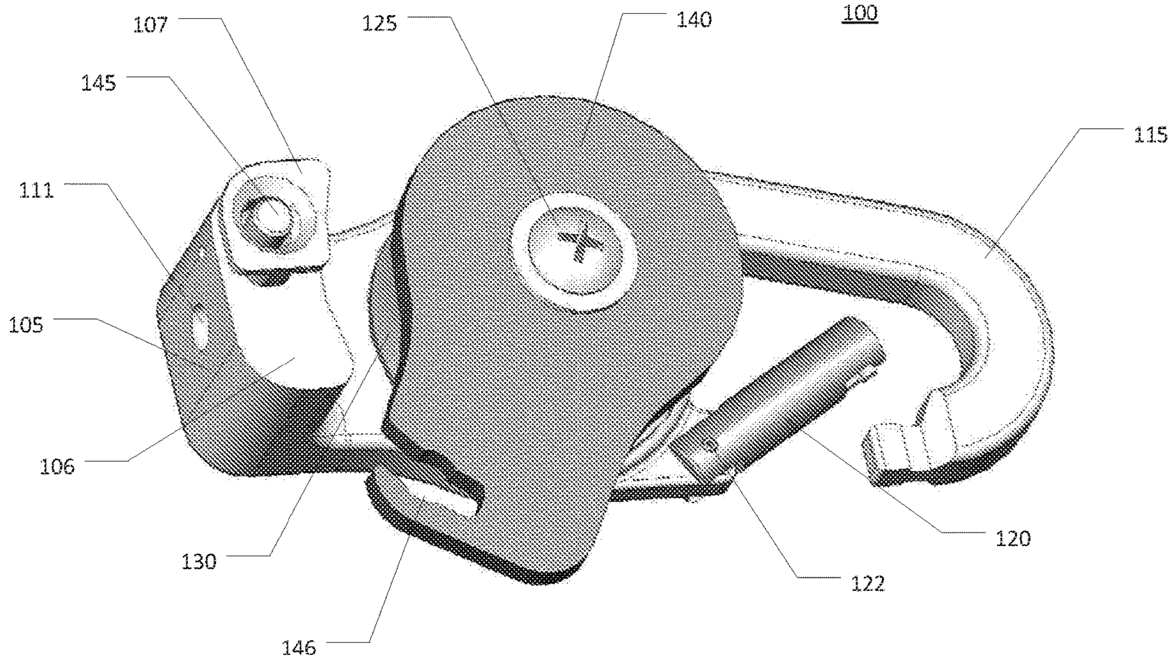
Figure 3A:
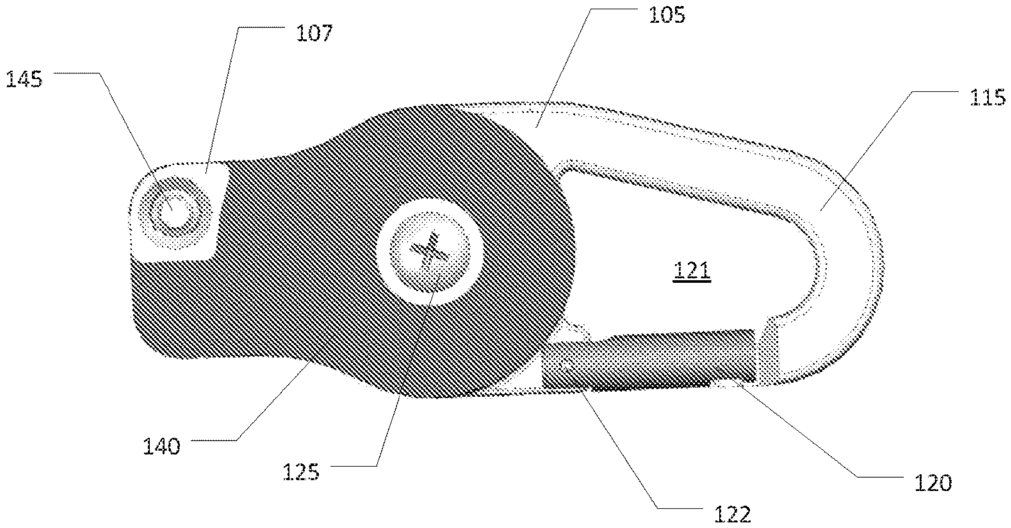
FIGS. 3A-C are drawings depicting, respectively, a front view, a side view, and a rear view of the device for hoisting and lowering a load in accordance with the embodiment shown in FIG. 1.
Figure 3B:
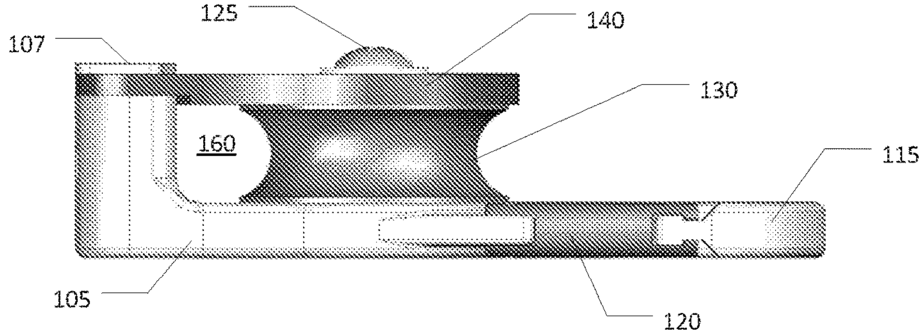
Figure 3C:
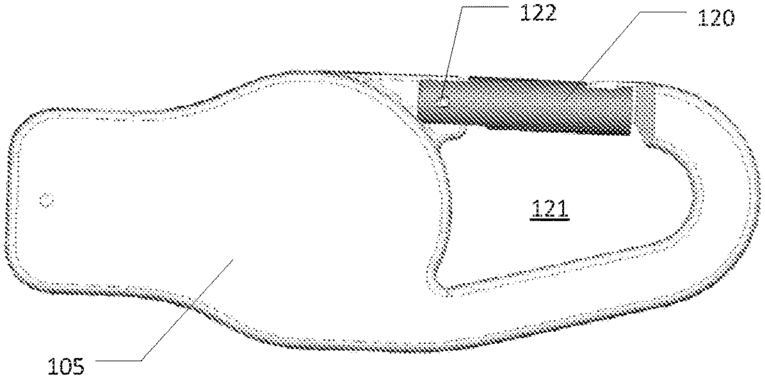
Figure 4:
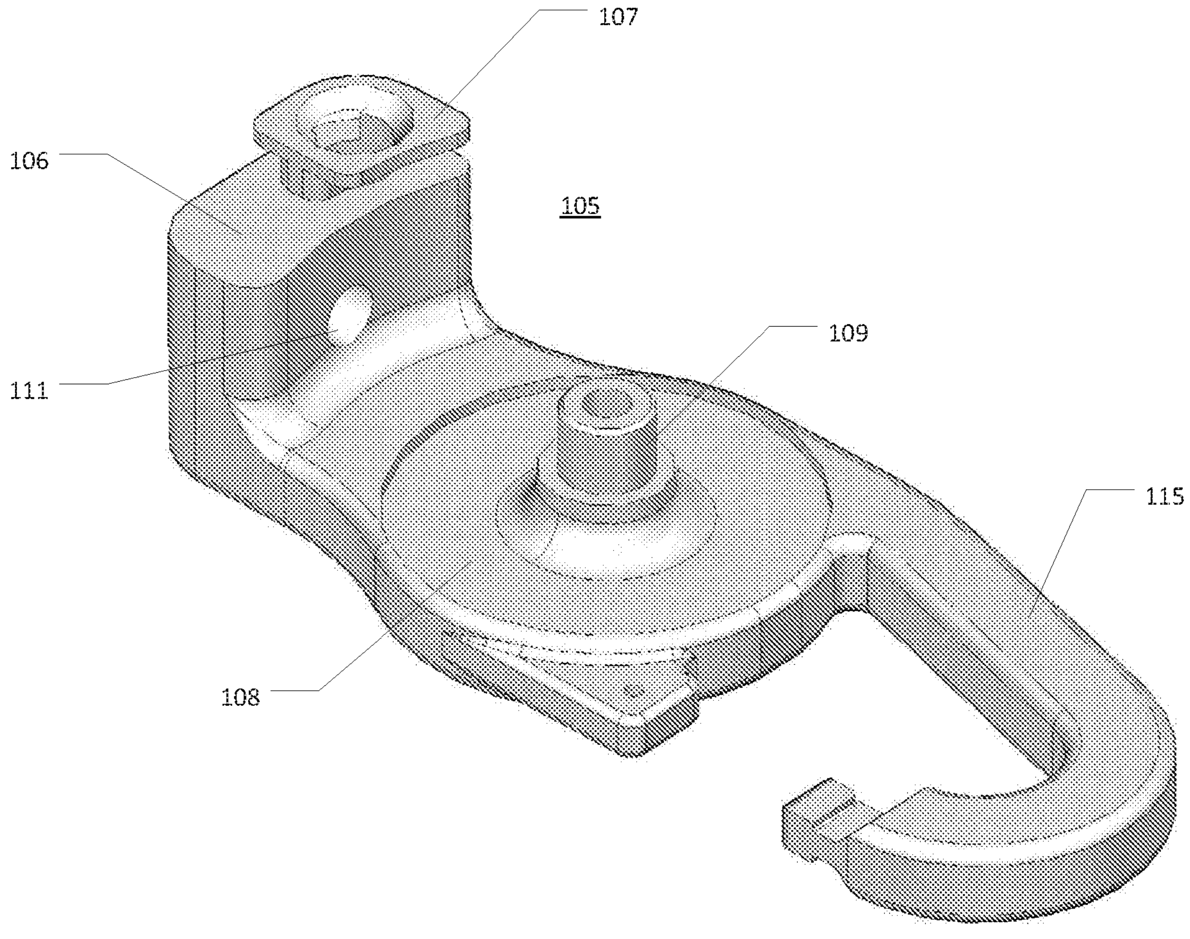
FIG. 4 is a drawing depicting the main body of the device for hoisting and lowering a load in accordance with the embodiment shown in FIG. 1.

FIGS. 1-4 illustrate one embodiment of a device 100 for hoisting or lowering a load, comprising a pulley. The device 100 has a main body 105, a sheave 130, and a front plate 140. The pulley is held together by a bolt 125, which goes through an axial hole 141 in the front plate and through a center 131 of the sheave 130 and anchors in the main body 105. Both the front plate 140 and the sheave 130 are configured to rotate about the bolt 125. As shown in FIG. 1, device 100 further comprises spacers 126, 127 and 132, which allow the sheave 130 and the front plate 140 to turn. A friction accessory 115 extends from the bottom of the main body 105. A gate 120 connects a distal end 117 of the friction accessory 115 to the main body 105. The gate 120 is anchored by a pin 122 in the main body 105 and, when closed, forms an enclosed space 121 between the friction accessory 115 and the main body 105. Referring to FIG. 4, the main body 105 of the pulley comprises a depression 108 and a hub 109 for accommodating the sheave 130 when assembled. The main body 105 further comprises a top hole 111, which accommodates a fastener 110 (See FIGS. 5-7). A front face 107 of the main body 105 is visible on the front of the device 100 when assembled and a recess 106 of the main body 105 is set back from the front of the device 100 and the front face 107 to accommodate the front plate 140. The front plate 140 is held in a closed position by releasable clasp 145, located in front face 107. The front plate 140 also comprises an opening 146 which intersects the releasable clasp 145. The device 100 further comprises a space between the sheave 130, the main body 105, the front plate 140 (when closed), forming a chamber 160 (see FIG. 3B).

The device 100 is designed to withstand significant stresses placed upon it as a load is hoisted or lowered. In particular, the main body 105 is be configured to withstand the greatest portion of the stresses caused by the weight of the load. As seen in FIG. 3B, where the device 100 is viewed from the left side, the main body 105 extends along a back side of the device 100, opposite front plate 140. In this example, the thickness of the main body 105 is notably thicker than the front plate 140 because the main body 105 is designed to carry a significant majority of the load. The main body 105 may be formed of steel or another structurally appropriate material, as known in the art. Further, the main body 105 may be manufactured by machining the chosen material or may be formed in a cast. Other appropriate manufacturing methods known in the art may also be used.

The friction accessory 115 is designed to create a significant amount of friction between a cord (e.g., a rope or cable) and the device 100, without causing damage to the cord. The friction accessory is attached to the main body 105 and comprises an elongated appendage which may have one or more turns or twists therein, such as the hook shape shown in FIGS. 1-5. The friction accessory may be formed as a trunk and one or more appendages, such as shown in FIGS. 6-7.

In some embodiments, the friction accessory 115 is also connected to the main body 105 by one or more gates 120 that extend from the main body 105 and contact an end 117 of a corresponding arm when in a closed position. For example, FIGS. 2A and 2B show the gate 120 connected to the main body 105 with the pin 122. The gate 120 is free to rotate about the pin, wherein the gate 120 is biased towards a closed position. The biasing feature of the gate 120 may result, for example, from using a spring pin as the pin 122.

The present disclosure further contemplates various alternative designs of the friction accessory 115, wherein the friction accessory 115 may have a more constricting enclosed area 121. Other configurations of the friction accessory 115 may comprise the enclosed area 121 with an adjustable width, (e.g., a pinching device), such that the amount of friction resulting from the friction accessory 115 may be adjusted for a particular application.

Figure 7A:
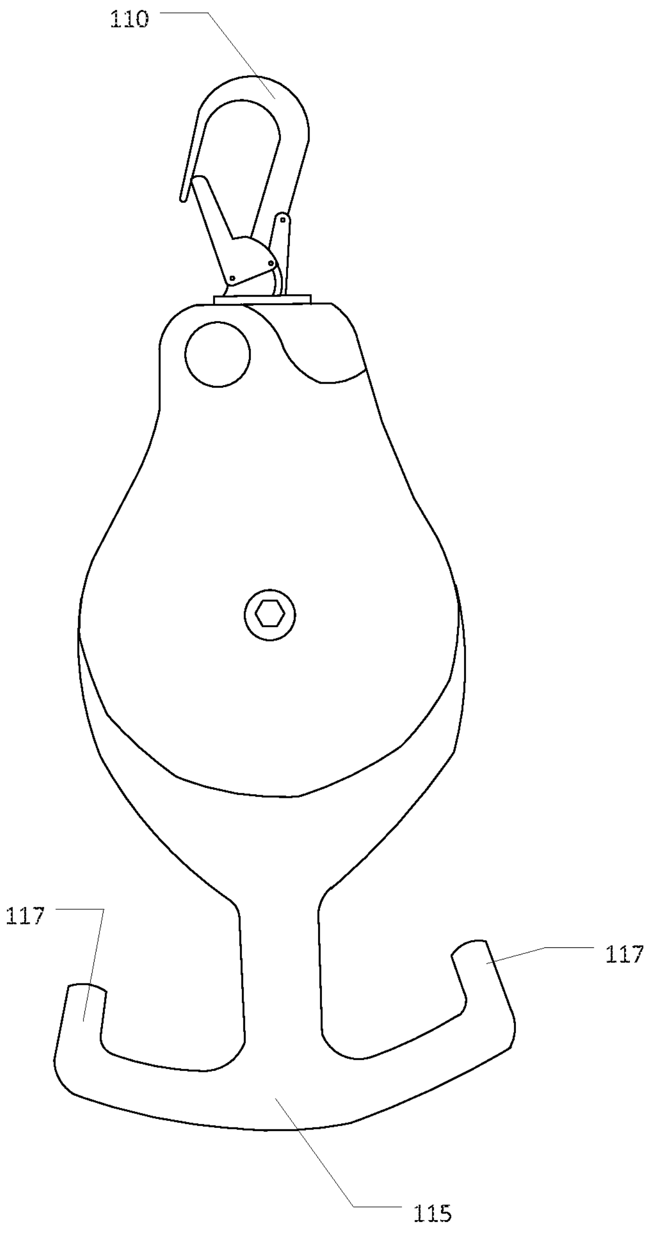
FIGS. 7A and 7B are drawings depicting, respectively, a front view and a side view of a device for hoisting or lowering a load in accordance with another embodiment the present disclosure.
Figure 7B:
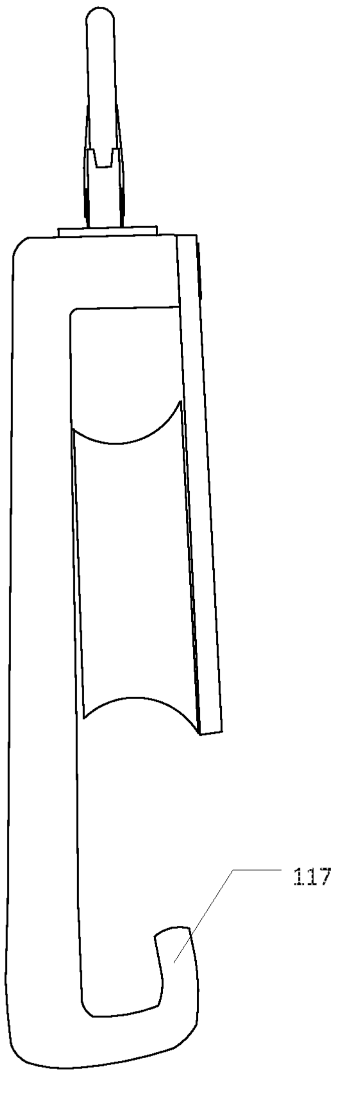

In some embodiments, the friction accessory 115 may be assembled without a gate, as in the embodiment illustrated in FIGS. 7A and 7B. In this instance, the friction accessory 115 comprises the trunk and two appendages, wherein the distal ends 117 of the appendages are turned upwards to prevent a cord from falling out of the friction accessory 115.

The sheave 130 of the device 100 may comprise a substantially cylindrical structure, wherein the bolt 125 passes approximately through the axis thereof. In some examples, the sheave 130 is configured to rotate a bout the bolt 125, facilitating the movement of a cord in hoisting or lowering a load. The sheave 130 may be formed having a concave profile along the periphery of the cylinder, to accommodate a cord. The material of the sheave 130, the structural strength, and other features may be chosen according to general specifications for sheaves and pulleys, as known in the art.

The front plate 140 is located at a distal end of the bolt 125 (i.e., at the end of the bolt 125 furthest from the main body 105). In some embodiments, as shown in FIG. 2B, the front plate 140 may be configured to rotate as a whole around the bolt 125. Alternatively, the front plate 140 may be comprised of two portions, wherein one is fixed and the other is able to be opened. The front plate 140, or a portion thereof, moves to provide access to a chamber 160 located between the sheave 130 and the main body 105. This allows the operator to place a bight (a middle portion) of cord into the device 100 without having to thread one end of the cord into the chamber 160 from the side of the device 100.

In each of the illustrated examples, the front plate 140 is configured to rotate about the bolt 125. The front plate 140 may alternatively be configured to reveal a side of the chamber 160 by rotating about a hinge or folding upon itself. The chamber 160 is open at each end thereof between the front plate 140 and the main body 105. In some embodiments, where the front plate 140 rotates about the bolt 125, the main body 105 is formed having the front comprising the recess 106 and the front face 107. The recess 106 is set back from the front face 107, and is formed to have a shape corresponding to the shape of the front plate 140. In this configuration, the recess 106 allows the front plate 140 to reach a closed position abutting a portion of the front face 107 and the main body 105. This arrangement constrains the rotation of the front plate 140 such that the rotation will occur in only one direction from the closed position. Limiting the movement of the front plate 140 to one direction provides a predictable movement for the operator, and therefore aids the operator in quickly preparing the device 100 to operate as part of a system for hoisting and lowering a load. Such a feature is an important consideration, where, for example, one of the embodiments discussed herein contemplates the use of the device in a rescue situation by an operator that may be wearing heavy, electrically-insulated gloves.

To hold the front plate 140 in the closed position, some embodiments comprise the releasable clasp 145. The releasable clasp 145 holds the front plate 140 in the closed position and allows the operator to control the opening of the front plate 140, thereby controlling access to the chamber 160. The releasable clasp 145 may be located between the main body 105 and the front plate 140 at any point where the two are adjacent when in the closed position. For example, the releasable clasp 145 may be located within the area of the recess 106 (as shown in FIGS. 6, 7A and 7B). The releasable clasp 145 may be placed in the area of the front face 107 (as shown in FIGS. 2A and 2B). Alternatively, the clasp 145 may be placed at or near the bolt 125, preventing the rotation of the front plate 145 from the closed position until disengaged by the operator.

In some embodiments, the releasable clasp 145 is configured attach the front plate 140 to the main body 105 by latching onto a physical feature of the front plate. For example, in FIG. 2B the front plate 140 comprises the opening 146 in the form of a gap, which has a shape that corresponds to the interface between the front face 107 and the recess 106. Alternatively, the opening 146 may comprise a hole, as in the embodiments illustrated in FIGS. 6 and 7

The releasable clasp 145 may comprise any suitable clasp or brake that performs the function described above, as may be known in the art. For example, the releasable clasp 145 may comprise a release button. In some examples, such as the embodiment illustrated in FIGS. 2A and 2B, the releasable clasp 145 may comprise a release button 147 that is arranged to have an outer surface that is flush with an outer surface of the front plate 140. This configuration provides an advantage where the releasable button 147 may otherwise be disengaged unintentionally. In some examples, the release button 147 is biased towards a position where the outer surface is flush with the outer surface of the front plate 140 by a spring. Other features of the front plate 140 and the releasable clasp 145 may be added without departing from the scope of the present disclosure, as will be apparent to one with skill in the art.

Figure 5:
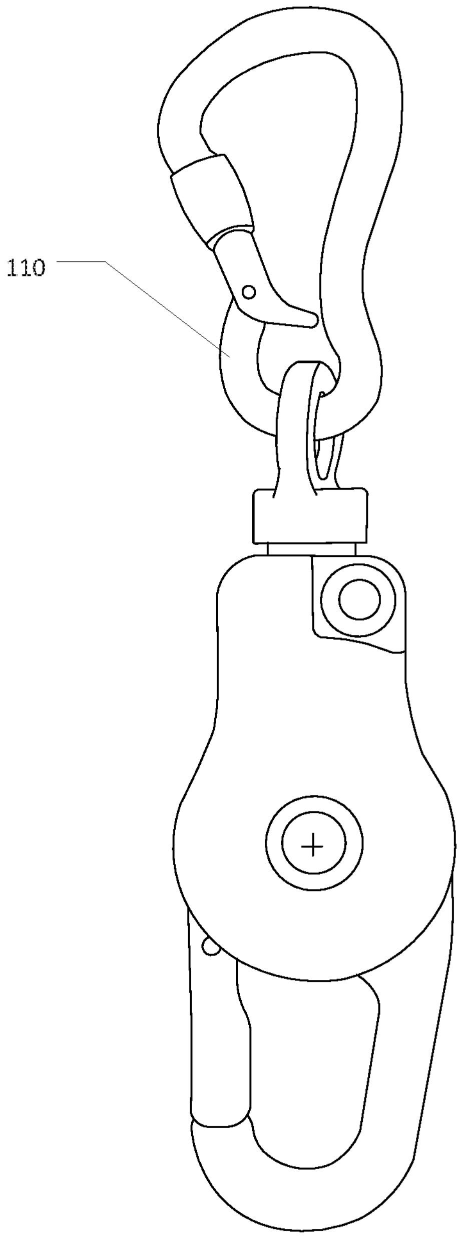
FIG. 5 is a drawing depicting a device for hoisting and lowering a load in accordance with another embodiment of the present disclosure.
Figure 6:
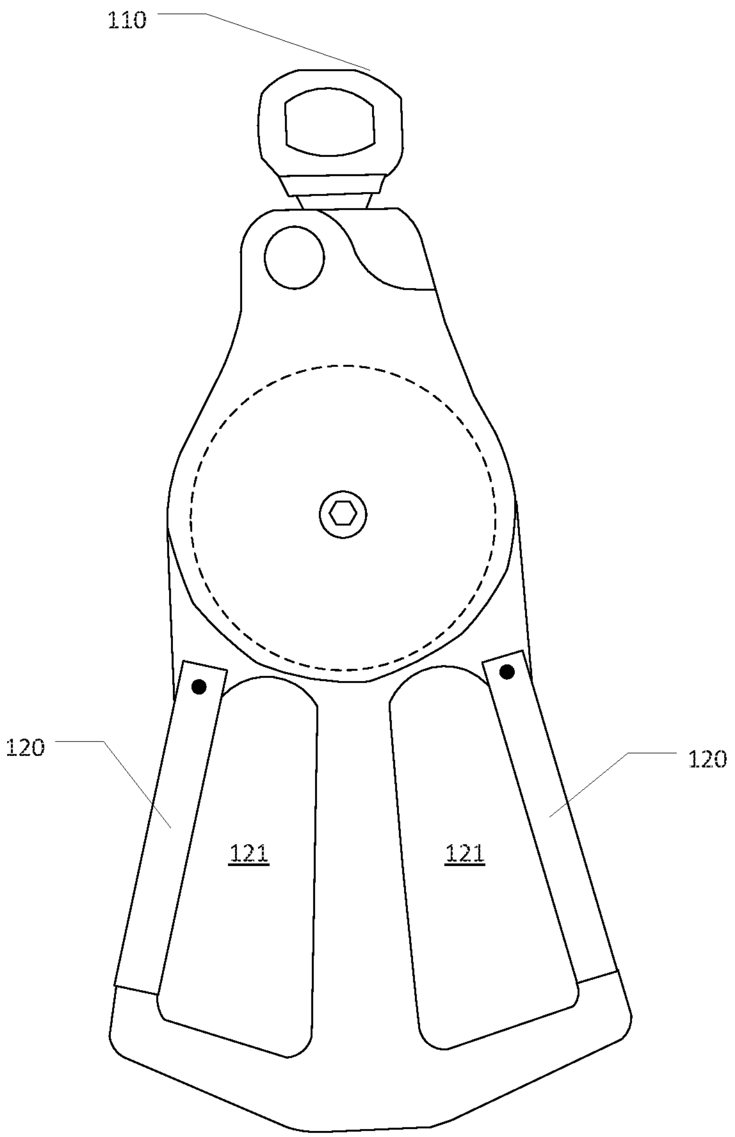
FIG. 6 is a drawing depicting a device for hoisting and lowering a load in accordance with another embodiment of the present disclosure.

In some embodiments, the device 100 further comprises the fastener 110 that can be used to secure the device 100 to a support structure (see FIGS. 5-7). The fastener 110 may be formed as a unitary piece with the main body 105. One example is provided in FIGS. 1-4, wherein the main body 105 comprises a top hole 111, which allows the fastener 110 to be attached to the main body 105 of the device 100. The fastener 110 may comprise, for example, an eye (FIG. 6), a hook, a gated hook (FIGS. 7A-7B), an eye and a carabiner in combination (FIG. 5), or any other suitable fastener.

Figure 8:
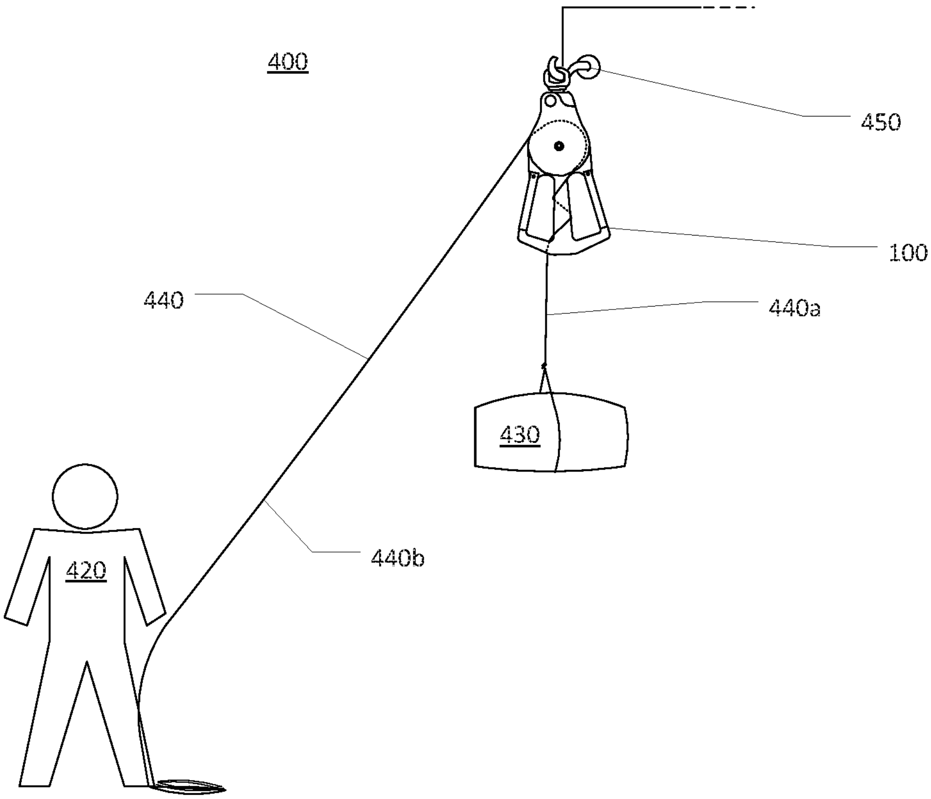
FIG. 8 is a schematic drawing depicting a system for hoisting or lowering a load in accordance with one embodiment the present disclosure.

Another aspect of the present disclosure, an embodiment of which is illustrated in FIG. 8, provides a system 400 for hoisting or lowering a load. The system 400 comprises the device 100, attached to a support structure 450, arranged with a cord 440 having a load bearing portion 440*a* and a restraining portion 440*b*. The load bearing portion 440*a* of the cord 440 runs from the friction assembly 115 of the device 100 to a load 430, located directly below the device 100. The restraining portion 440*b* of the cord 440 runs from the sheave 130 of the device 100 to an operator 420.

The system 400 of the present disclosure is intended to allow the operator 420 to hoist or lower the load 430 with minimal effort. In particular, the system 400 of the present disclosure may be used to significantly reduce the amount of preparation time, while also providing the operator 420 (i.e., user) with enough resistance to have a substantial control when lowering a heavy load, even where circumstances place the operator 420 in a precarious position, such as where the operator 420 is at an elevated position and is working within a limited space or surface area, thereby decreasing the amount of leverage available.

Referring to the description of the device above, the cord 440 is arranged relative to the device 100 such that the load bearing portion 440*a* descends from a friction accessory 115 of the device. Accordingly, the restraining portion 440*b* of the cord 440 is in contact with the sheave 130 at a point within chamber 160. This arrangement is simple to complete, even for an operator 420 located at an elevated location, equal to or higher than the device 100. In comparison to the prior art, the system may be prepared by an operator 420, having ascended to an elevated location for example where an injured person is suspended, and further allows the operator 420 to lower the load 430 from the elevated location.

The operator 420 may be in any orientation relative to the device 410. In situations where the system 400 is used to hoist the load 430 and where the operator 420 is located directly above the device 100, such that the restraining portion 440*b* is substantially vertical, the device 100 could potentially turn to one side or the other and place the cord 440 in a position relative to the device 100 that very little friction is created between the device 100 and the cord 440. Referring to the description of the device above, one example of a solution is to provide the device 100 with a second fastener, such as on the back of the main body 105 or connected to the friction device, thereby connecting the device 410 of system 400 to the support structure 450 in at least two places, thereby fixing the orientation of the device 410. Alternatively, the main body 105 of the device may be constructed to have a narrow top portion above the sheave 130, thereby allowing the rope 440 to come in contact with the sheave 130 from a variety of angles without causing undue stress on the main body 105.

The manner in which the cord 440 is engaged with the friction accessory 115 may have a large impact on the amount of friction, and can be adjusted accordingly to manage the weight of the load 430. In some examples, the cord 440 is wrapped around a vertical portion of the friction accessory 115, as shown in FIG. 8. It is estimated that one 360° wrap of the cord 440 around the friction accessory 115 will reduce the amount of force required to stabilize the load by a factor of 10. Two wraps (720°) will reduce the amount of force required by an approximate factor of 50.

The operator 420 may be a person, as depicted in FIG. 8, or may be a machine. Some examples of machines that may perform or aid in the performance of the function of the operator 420 include: cranking mechanisms, (e.g., winch, spinning reels, ratcheting devices, jacks, etc.); industrial machinery, (e.g., forklifts, vehicles, cranes); and other machines, (e.g., levers, etc.). This list is not meant to be exhaustive and should not be construed as limiting the scope of the present disclosure.

The load 430 that is hoisted or lowered by the system 400 may be any item that requires hoisting or lowering. The system 400 is particularly useful in connection with lowering a heavy load where the situation provides very little time or resources for preparing a lowering mechanism. In an alternative example, the device 100 is used to lower the load 430, where the load 430 comprises an injured person, from an elevated location. Some other examples of the load 430, where expediency may be required, include hazardous materials, heavy equipment, or another item having an impact on safety. Further, various embodiments of the system 400 of the present disclosure may be employed to avoid the negative impact of an externality, such as a thunderstorm or other natural or man-made emergency.

The system 400 is described above as comprising the cord 440, but the rope may be a cable or wire rope. The cord (e.g., rope or cable) of the system may be manufactured from any suitable material for the application. Durability and strength are key factors in determining what cord to use in any particular application. Such choices are within the scope of those knowledgeable in the art.

The system 400 is useful to hoist or lower the load 430 where the device 410 is attached to the support structure 450. The support structure 450 may comprise a building, a wall, a fence, a vehicle, a scaffold, a power pole, or any other structure capable of support the weight of the load 430. The support structure 450 may further comprise a device for connecting the device 410 to the support structure 450, such as a hook or a cable connected to the support structure 450.

Other embodiments of the system may be arranged to create a mechanical advantage. One example of a system with a mechanical advantage similar to a set-of-fours is constructed with the device, secured to a support structure, and a cord. The cord is loaded into the chamber, the cord comprising an end with a loop or an eye. The loop or eye is then placed over an end of the friction accessory. A bight of the cord, between the device and the loop or eye, is then passed through an eye or other opening of a fastener attached to the load. The bight of cord is then placed over an end of the friction accessory, similar to the loop or eye in the end of the cord. The result is an arrangement whereby the operator can use the restraining portion of the cord to hoist the load using a mechanical advantage of 2 to 1, ignoring friction.

Figure 9:
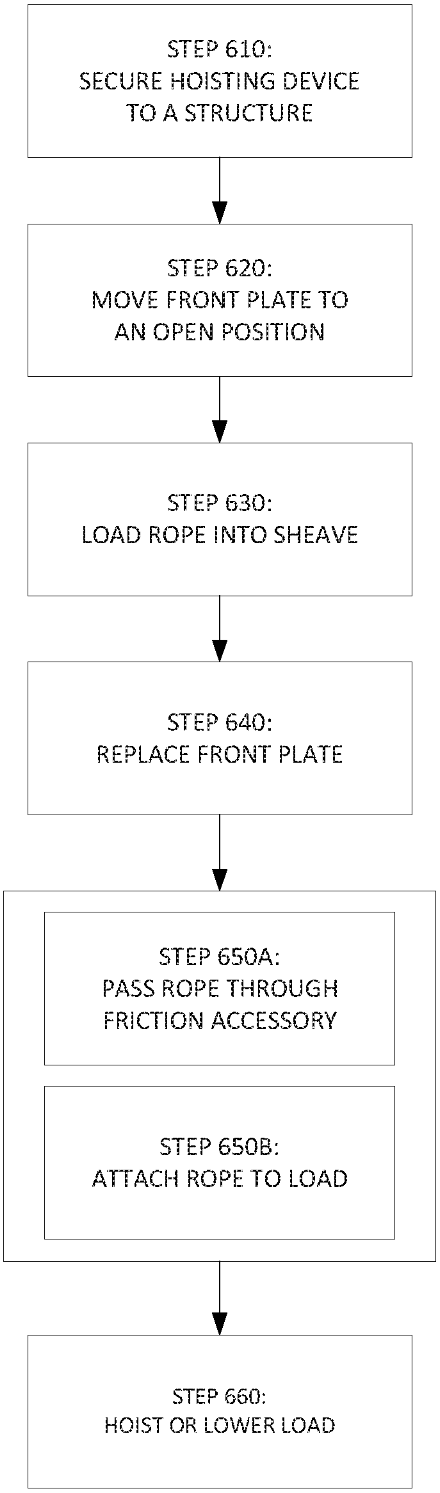
FIG. 9 is a flowchart depicting a method for hoisting or lowering a load in accordance with one embodiment the present disclosure.

In operation, the device and system of the present disclosure may be employed as part of a method for hoisting and/or lowering a load. FIG. 9 illustrates one embodiment of a method according to the present disclosure. The order of the various steps described below may be changed without departing from the scope of the invention.

The hoisting device is first secured to a structure. (STEP 610). The device may be any example of a device in accordance with the present disclosure. The structure may be any structure capable of supporting the load that is being lifted, and may comprise a person. The structure may further comprise a device or feature that enables the attachment of the device to the structure, such as a hook or a harness.

The device is prepared for use by moving the front plate to an open position. (STEP 620). In some embodiments, this step is performed by disengaging the releasable clasp and swiveling the front plate from the closed position to an open position, thereby opening the chamber and gaining general access to the sheave. Once the front plate is placed in an open position, a bight of cord may be loaded into the sheave. (STEP 630). Once the cord is in position against the sheave, the front plate may be returned to the closed position and the releasable clasp engaged. (STEP 640).

The method of the present disclosure further provides a step of passing the cord through the friction accessory. (STEP 650A). The rope is placed in the friction accessory in a manner that will roughly create the desired amount of friction. In some instances, the operator may choose to wrap the cord around a portion of the friction accessory more than once, so long as the cord is still capable of moving against the friction accessory in hoisting or lowering the load.

Another step comprises attaching the cord to the load. (STEP 650B). The step of attaching the cord to the load may include tying a knot around the load, attaching an end of the cord to a fastener, or any other method known in the art. While the steps of the method described in the present disclosure are not strictly limited by a particular order, many of the steps have a relative order that aids in the performance of the method. The respective steps of placing the rope in the friction accessory and attaching the cord to the load are particularly interchangeable, depending on the circumstances. Where the load is partially suspended prior to using this method, the method is best employed by engaging the cord with the friction accessory prior to attaching the rope to the load.

With the rope and device in place, the operator may then perform the step of hoisting or lowering the load. (STEP 660). As explained above, the method of the present disclosure provides particular advantages when lowering a load because the friction created will tend to reduce the amount of force required to keep the load suspended from the device. Still, the method of the present disclosure does provide some advantages in hoisting a device as well. In particular, while the friction works against the operator when lifting, the friction provides the operator with some security against dropping the load and allows the operator to pause while hoisting the load without losing progress, so long as some tension is continuously placed on the cord.

It should be emphasized that the above-described embodiments of the present apparatus and process are merely possible examples of implementations and merely set forth for a clear understanding of the principles of the disclosure. Many different embodiments of the disclosure described herein may be designed and/or fabricated without departing from the spirit and scope of the disclosure. All these and other such modifications and variations are intended to be included herein within the scope of this disclosure and protected by the following claims. Therefore the scope of the disclosure is not intended to be limited except as indicated in the appended claims.

The invention claimed is:

1. A device comprising:

a main body having a rear wall, a cylindrical post extending forwardly from the rear wall, and a boss that also extends forward from the rear wall, the boss carrying a releasable clasp configured as a push button;

a sheave supported on the cylindrical post for rotation relative to the main body, the sheave including a front face and a rear face, the rear face of the sheave being adjacent to the rear wall of the main body, the sheave also including an outer circumferential groove, the outer circumferential groove sized and configured to accommodate a portion of an outer surface of a cable; and a front plate rotatably coupled to the cylindrical post so as to overlay the front face of the sheave and selectively overlay at least a portion of a front surface of the boss of the main body, the front plate comprising an opening that is selectively engageable with the releasable clasp such that, when the releasable clasp is selectively engaged with the opening, the releasable clasp restrains the front plate against rotation relative to the main body, wherein a thickness of the main body is greater than a thickness of the front plate.

2. The device of claim 1, further comprising a bolt securing the sheave to the main body, the bolt being threadedly engaged with the cylindrical post of the main body.

3. The device of claim 2, wherein the bolt further secures the front plate to the cylindrical post of the main body, and wherein the front plate is configured to rotate about an axis of the bolt.

4. The device of claim 1, wherein the boss is formed on a first end of the main body, and wherein a fastener extends from the first end of the main body.

5. The device of claim 4, wherein the fastener is rotatably coupled to the first end of the main body such that the main body can rotate relative to the fastener.

6. The device of claim 4, wherein the fastener comprises one of an eye, a hook, a gated hook, or a carabiner.

7. The device of claim 1, wherein:

the releasable clasp is biased by a spring towards a position that, when the opening of the front plate is engaged with the releasable clasp, restrains the front plate; and when the releasable clasp is depressed, the releasable clasp disengages from the opening of the front plate allowing the front plate to rotate relative to the main body.

8. The device of claim 7, wherein the spring biases the releasable clasp towards a position at which an outer surface of the releasable clasp is flush with an outer surface of the front plate.

9. The device of claim 1, wherein the opening of the front plate comprises a slot.

10. The device of claim 1, wherein when the front plate is restrained in a closed configuration by the releasable clasp, a cable mounted on the sheave is retained between the main body and the front plate.

11. The device of claim 1, further comprising a friction accessory extending from the main body.

12. The device of claim 11, wherein the friction accessory extends from the main body at a position being offset from the sheave such that, when viewed from the side, a plane defined by the rear face of the sheave does not intersect the friction accessory.

13. The device of claim 11, wherein the friction accessory is unitary and monolithic with the main body.

14. The device of claim 11, wherein the friction accessory includes a gate that is pivotally secured to the main body.

15. The device of claim 14, wherein the gate comprises a recess that receives a distal end of the friction accessory.

16. The device of claim 14, wherein the friction accessory and the gate define an enclosed space that is configured to capture an entire diameter of at least a portion of the cable when the cable is wrapped at least one time around at least a portion of the friction accessory.

17. The device of claim 11, wherein the friction accessory extends tangentially away from the sheave.

18. The device of claim 11, wherein the friction accessory comprises a first portion that extends tangentially away from an outer circumference of the sheave, the first portion terminating at a hook-shaped end that bends back towards the sheave.

19. The device of claim 11, wherein the friction accessory comprises a double-headed hook.

20. The device of claim 11, wherein the friction accessory comprises a hook, a distal end of the hook extending tangentially to a plane of the rear wall of the main body.

* * * * *